United States Patent
Salvucci et al.

(10) Patent No.: US 10,417,624 B2
(45) Date of Patent: *Sep. 17, 2019

(54) SYSTEM, METHOD, AND APPARATUS FOR PURCHASING, DISPENSING, OR SAMPLING OF PRODUCTS

(71) Applicant: TransparenSee LLC, Marietta, GA (US)

(72) Inventors: Denise Lisa Salvucci, Corona Del Mar, CA (US); Michael J. Kline, Corona Del Mar, CA (US)

(73) Assignee: TRANSPARENSEE LLC, Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,463

(22) Filed: Nov. 2, 2018

(65) Prior Publication Data

US 2019/0073648 A1    Mar. 7, 2019

Related U.S. Application Data

(63) Continuation of application No. 15/360,503, filed on Nov. 23, 2016, now Pat. No. 10,121,132, which is a continuation of application No. 14/269,741, filed on May 5, 2014, now Pat. No. 9,527,716, which is a continuation-in-part of application No. 14/087,881, filed on Nov. 22, 2013, now Pat. No. 9,633,504.

(51) Int. Cl.
| | |
|---|---|
| *G06Q 20/18* | (2012.01) |
| *B67D 1/08* | (2006.01) |
| *G06Q 20/32* | (2012.01) |
| *G07F 9/02* | (2006.01) |
| *B67D 1/00* | (2006.01) |

(52) U.S. Cl.
CPC ........... *G06Q 20/18* (2013.01); *B67D 1/0034* (2013.01); *B67D 1/0888* (2013.01); *G06Q 20/32* (2013.01); *G07F 9/023* (2013.01)

(58) Field of Classification Search
CPC ............................. G07F 13/00; G07F 13/065
USPC ................................................. 700/231–244
See application file for complete search history.

(56) References Cited

U.S. PATENT DOCUMENTS

| | | | |
|---|---|---|---|
| 4,512,431 A | 4/1985 | Bloomfield | |
| 4,534,818 A | 8/1985 | Kreager et al. | |
| 6,161,059 A | 12/2000 | Tedesco et al. | |
| 6,413,000 B1 | 7/2002 | Borcherds et al. | |

(Continued)

FOREIGN PATENT DOCUMENTS

| | | |
|---|---|---|
| CA | 2912016 A1 | 11/2014 |
| WO | 98/45766 A1 | 10/1998 |
| WO | 2013/077895 A1 | 5/2013 |

OTHER PUBLICATIONS

Dietz, "Wireless Liquid Level Sensing for Restaurant Applications", MERL—A Mitsubishi Electric Research Laboratory, Apr. 2002, pp. 1-8.

(Continued)

*Primary Examiner* — Timothy R Waggoner
(74) *Attorney, Agent, or Firm* — BakerHostetler

(57) ABSTRACT

A product dispenser includes a product sampling portion configured to contain a product to be sampled. The product sampling portion includes a product sample dispenser. A packaged product portion is configured to contain and dispense a packaged product corresponding to a product to be sampled.

20 Claims, 5 Drawing Sheets

(56) References Cited

U.S. PATENT DOCUMENTS

| | | |
|---|---|---|
| 6,751,525 B1 | 6/2004 | Crisp, III |
| 7,493,267 B1 | 2/2009 | Walker et al. |
| 7,627,496 B2 | 12/2009 | Walker et al. |
| 7,757,896 B2 | 7/2010 | Carpenter et al. |
| 8,340,815 B2 | 12/2012 | Peters et al. |
| 8,364,520 B1 | 1/2013 | Eichorn et al. |
| 8,392,019 B2 | 3/2013 | Segal et al. |
| 8,489,450 B2 | 7/2013 | Agarwal |
| 8,601,938 B2 | 12/2013 | Huber et al. |
| 8,616,250 B2 | 12/2013 | Herbert |
| 8,656,690 B2 | 2/2014 | Bierschenk et al. |
| 8,744,618 B2 | 6/2014 | Peters et al. |
| 8,755,932 B2 | 6/2014 | Peters et al. |
| 8,787,006 B2 | 7/2014 | Golko et al. |
| 8,788,341 B1 | 7/2014 | Patel et al. |
| 9,155,330 B1 | 10/2015 | Shtivelman |
| 9,527,716 B2 * | 12/2016 | Kline ............... B67D 1/0888 |
| 9,633,504 B2 * | 4/2017 | Kline ............... G06Q 30/0259 |
| 9,701,530 B2 | 7/2017 | Kline et al. |
| 10,121,132 B2 * | 11/2018 | Salvucci ........... B67D 1/0888 |
| 10,319,001 B2 * | 6/2019 | Kline ............... G06Q 30/0282 |
| 2002/0173875 A1 | 11/2002 | Wallace et al. |
| 2003/0055727 A1 | 3/2003 | Walker et al. |
| 2003/0208409 A1 | 11/2003 | Mault |
| 2004/0049427 A1 | 3/2004 | Tami et al. |
| 2004/0065700 A1 | 4/2004 | Milian |
| 2004/0118733 A1 | 6/2004 | Pauli |
| 2004/0137078 A1 | 7/2004 | Najafi et al. |
| 2004/0241759 A1 | 12/2004 | Tozer et al. |
| 2004/0247911 A1 | 12/2004 | Saito |
| 2004/0249711 A1 | 12/2004 | Walker et al. |
| 2005/0048461 A1 | 3/2005 | Lahteenmaki |
| 2005/0193896 A1 | 9/2005 | McGill |
| 2005/0210834 A1 | 9/2005 | Kamineni |
| 2005/0226970 A1 | 10/2005 | Gordon |
| 2005/0273387 A1 | 12/2005 | Previdi |
| 2006/0027597 A1 | 2/2006 | Chow et al. |
| 2006/0081653 A1 | 4/2006 | Boland et al. |
| 2006/0247824 A1 | 11/2006 | Walker et al. |
| 2006/0278093 A1 | 12/2006 | Biderman et al. |
| 2007/0027576 A1 | 2/2007 | Juds et al. |
| 2007/0050083 A1 | 3/2007 | Signorelli et al. |
| 2007/0078561 A1 | 4/2007 | Sansone |
| 2007/0100649 A1 | 5/2007 | Walker et al. |
| 2007/0110880 A1 | 5/2007 | Thomas et al. |
| 2007/0156523 A1 | 7/2007 | Liu et al. |
| 2007/0255450 A1 | 11/2007 | Mazur et al. |
| 2008/0077455 A1 | 3/2008 | Gilboa |
| 2009/0065520 A1 | 3/2009 | Peters et al. |
| 2009/0065570 A1 | 3/2009 | Peters et al. |
| 2009/0069931 A1 | 3/2009 | Peters et al. |
| 2009/0070234 A1 | 3/2009 | Peters et al. |
| 2009/0138817 A1 | 5/2009 | Oron et al. |
| 2009/0177318 A1 | 7/2009 | Sizemore |
| 2009/0222300 A1 | 9/2009 | Guith et al. |
| 2009/0222301 A1 | 9/2009 | Phillips et al. |
| 2009/0222339 A1 | 9/2009 | Antao et al. |
| 2009/0222340 A1 | 9/2009 | Insolia et al. |
| 2010/0131096 A1 | 5/2010 | Koyano |
| 2010/0169313 A1 | 7/2010 | Kenedy et al. |
| 2010/0200110 A1 | 8/2010 | Segiet et al. |
| 2010/0280895 A1 | 11/2010 | Mottola |
| 2010/0286819 A1 | 11/2010 | Walker et al. |
| 2011/0038474 A1 | 2/2011 | Omiya |
| 2011/0049180 A1 | 3/2011 | Carpenter et al. |
| 2011/0121032 A1 | 5/2011 | Deo et al. |
| 2011/0168290 A1 | 7/2011 | Breitenbach et al. |
| 2011/0282723 A1 | 11/2011 | Phillips et al. |
| 2012/0053426 A1 | 3/2012 | Webster et al. |
| 2012/0055718 A1 | 3/2012 | Chen |
| 2012/0150613 A1 | 6/2012 | Insolia et al. |
| 2012/0190386 A1 | 7/2012 | Anderson |
| 2012/0325844 A1 | 12/2012 | Quartarone et al. |
| 2012/0325845 A1 | 12/2012 | Newman et al. |
| 2013/0002724 A1 | 1/2013 | Heinrich et al. |
| 2013/0025529 A1 | 1/2013 | Key |
| 2013/0027060 A1 | 1/2013 | Tralshawala et al. |
| 2013/0035787 A1 | 2/2013 | Canter |
| 2013/0037565 A1 | 2/2013 | Newman |
| 2013/0044042 A1 | 2/2013 | Olsson et al. |
| 2013/0079117 A1 | 3/2013 | Maskatia et al. |
| 2013/0079926 A1 | 3/2013 | Peters et al. |
| 2013/0096715 A1 | 4/2013 | Chung et al. |
| 2013/0103187 A1 | 4/2013 | Canter et al. |
| 2013/0220480 A1 | 8/2013 | Angus et al. |
| 2013/0226338 A1 | 8/2013 | Pickett et al. |
| 2013/0240559 A1 | 9/2013 | Rudick |
| 2013/0245819 A1 | 9/2013 | Davenport et al. |
| 2013/0248560 A1 | 9/2013 | Carpenter et al. |
| 2013/0282169 A1 | 10/2013 | Moore et al. |
| 2013/0282451 A1 | 10/2013 | Moore et al. |
| 2013/0304265 A1 | 11/2013 | Deo et al. |
| 2014/0027502 A1 | 1/2014 | Schwartz |
| 2014/0040055 A1 | 2/2014 | Quartarone et al. |
| 2014/0130891 A1 | 5/2014 | Abdelmoteleb et al. |
| 2014/0135967 A1 | 5/2014 | Bippert |
| 2014/0212566 A1 | 7/2014 | Herbert et al. |
| 2014/0246452 A1 | 9/2014 | Roekens et al. |
| 2014/0255883 A1 | 9/2014 | Macquet |
| 2014/0257749 A1 | 9/2014 | Nathanson |
| 2014/0286123 A1 | 9/2014 | Arnett et al. |
| 2014/0307756 A1 | 10/2014 | Chen et al. |
| 2014/0356492 A1 | 12/2014 | Merea |
| 2015/0100152 A1 | 4/2015 | Barragan et al. |
| 2015/0105901 A1 | 4/2015 | Joshi et al. |
| 2015/0144650 A1 | 5/2015 | Kline et al. |
| 2015/0144652 A1 | 5/2015 | Kline et al. |
| 2015/0144653 A1 | 5/2015 | Kline et al. |
| 2015/0239724 A1 | 8/2015 | Cronise |
| 2015/0290795 A1 | 10/2015 | Oleynik |
| 2016/0005329 A1 | 1/2016 | Sako et al. |
| 2016/0012749 A1 | 1/2016 | Connor |
| 2016/0148536 A1 | 5/2016 | Ashby |
| 2016/0260351 A1 | 9/2016 | Okuma et al. |
| 2016/0379520 A1 | 12/2016 | Borel et al. |

OTHER PUBLICATIONS

Caprio, "Calories from Soft Drinks—Do They Matter?", The New England Journal of Medicine, Sep. 27, 2012, pp. 1-2.

"Food Labeling: Nutrition Labeling of Standard Menu Items in Restaurants and Similar Retail Food Establishments", Federal Register, Dec. 1, 2014, pp. 1-105, vol. 79, No. 230.

"Food Labeling: Calorie Labeling of Articles of Food in Vending Machines", Federal Register, Dec. 1, 2014, pp. 1-35.

* cited by examiner

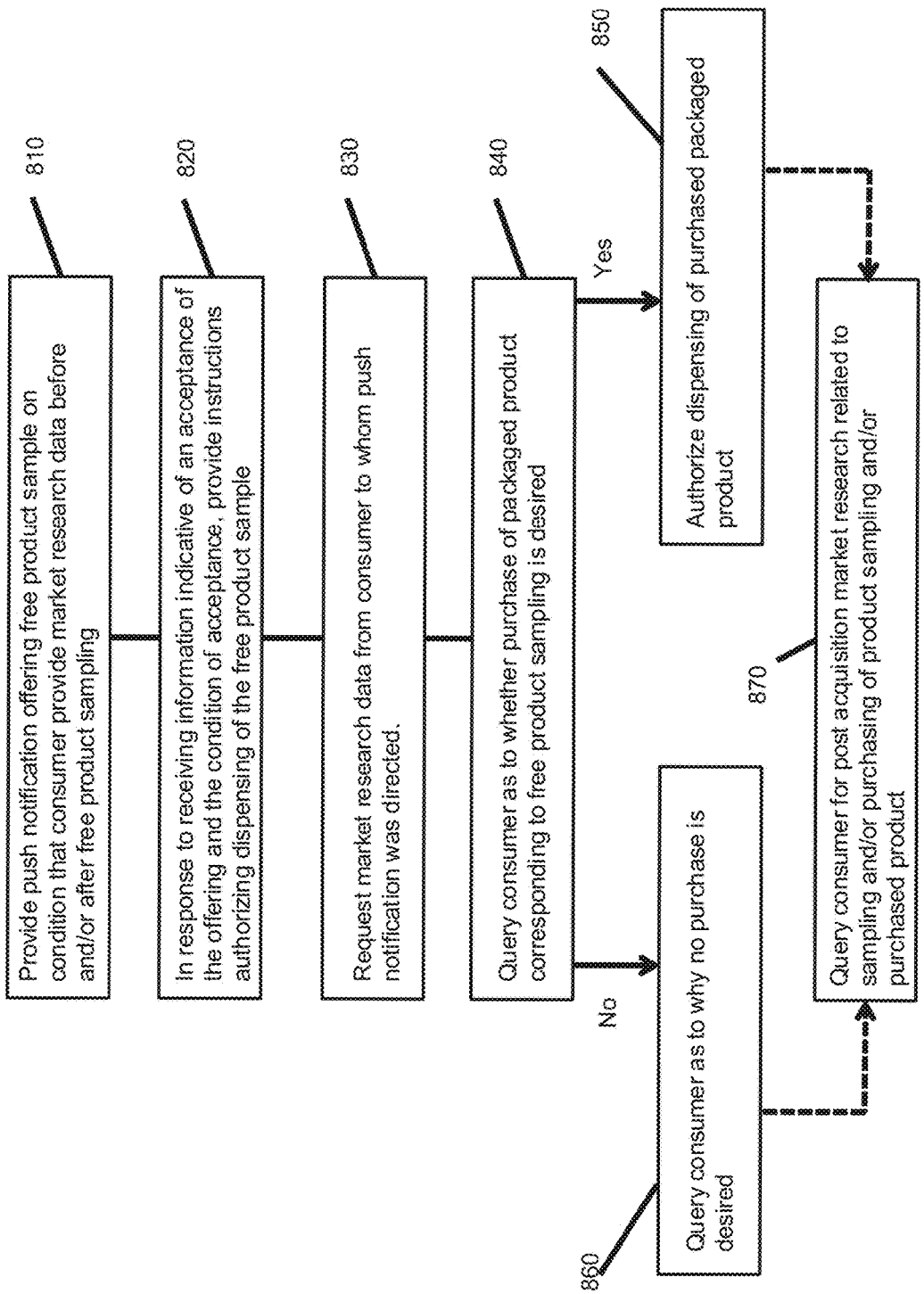

SYSTEM, METHOD, AND APPARATUS FOR PURCHASING, DISPENSING, OR SAMPLING OF PRODUCTS

CROSS-REFERENCE TO RELATED APPLICATIONS

This application is a continuation of, and claims priority to, U.S. patent application Ser. No. 15/360,503, filed Nov. 23, 2016. U.S. patent application Ser. No. 15/360,503 is a continuation of U.S. patent application Ser. No. 14/269,741, filed May 5, 2014. U.S. patent application Ser. No. 14/269,741 is a continuation-in-part of U.S. patent application Ser. No. 14/087,881, filed Nov. 22, 2013, now U.S. Pat. No. 9,527,716 B2 issued Dec. 27, 2016. U.S. patent application Ser. No. 15/360,503 is incorporated herein by reference in its entirety. U.S. patent application Ser. No. 14/269,741 is incorporated herein by reference in its entirety. U.S. patent application Ser. No. 14/087,881 is incorporated herein by reference in its entirety.

BACKGROUND

Consumers are becoming increasingly savvy in their product purchasing behaviors. They use their smart phones to perform price comparisons. They select, at point of purchase, from several available options. For example, users may select from one of several different car washes available at a gasoline kiosk. And, when shopping for food or other products, consumers frequently ask the seller to try a free sample of the food or other product, such as perfume, being sold or displayed. There exists an opportunity and need to provide consumers with a greater range of options when making their purchasing decisions.

The Coca-Cola Company currently markets and sells non-alcoholic beverages through various outlets and dispensing and vending equipment. One such type of dispensing equipment is known as the Freestyle® dispensing machine, which permits customers to select from over one hundred different product and flavor combinations. Such dispensing machines are often placed in fast food restaurants, convenience stores, malls, and other venues that tend to attract consumers. An example of the apparatus, processes, methods, and systems potentially associated with the Freestyle® dispensing machine is disclosed in U.S. Pat. No. 8,340,815, to Peters, et al., incorporated in its entirety by reference herein.

Frequently, a consumer attempting to use a Freestyle® vending machine may be uncertain as to which of the over one hundred offerings to choose. This can lead to not only an unhappy consumer who may select an offering that he or she does not enjoy, but also may lead to other unhappy consumers waiting in line for such uncertain consumers to make a flavor selection.

The Coca-Cola Company currently provides a Freestyle® smart phone application that may be directed at addressing this problem by permitting consumers to pre-select on the application their favorite flavor offerings. The application permits consumers to consult a selection of over one hundred choices, mix their own virtual flavors, and start adding favorite brands and mixes to the application user's favorites list. The application provides for push notifications, locates Freestyle® machines in proximity to the application user, and offers a "Mobile App Sweepstakes."

The Coca-Cola Company, and other entities that sell products, are continuously looking for new ways to market their products and demonstrate their attributes relative to competitive products and to encourage consumers to try both existing and new product offerings. Moreover, given the well-publicized global obesity epidemic, companies that sell calorie containing products are working hard to offer lower calorie options and to demonstrate to the consuming public, as well as governmental agencies, of their efforts in this regard.

Often, sellers of consumer products, in order to increase consumer awareness of their brands, offer—sometimes for a limited time—non-standard product variants or line extensions of such brands; one example, in the context of beverages, is Mountain Dew® "Kickstart," currently being offered by PepsiCo, Inc., in Black Cherry and Limeade flavors. But often, consumers will be reluctant to commit to purchasing a six or 12-pack of such a line extension, or even to purchase a single serving thereof. For this reason, products—particularly new products or variants of existing products—are often marketed with promotions, including free product sampling at venues attracting numerous consumers, such as sporting events, concerts, etc. Other products, such as health, beauty, and personal care products marketed, for example, by Procter & Gamble, are sometimes sampled in drug stores, supermarkets, etc., or by sending small free samples to potential consumers in the mail.

But such promotions often require hiring numerous promotions staff, and/or employees to hand out free product samples for example, and do not typically provide an option for consumers to purchase the sampled products immediately after sampling, when there exists the greatest opportunity to make a product sale, or to obtain and/or transmit and store post-sampling market research data.

In the context of consumer products, the period of time after which a consumer first notices or is presented with an offered product and makes a purchasing decision is sometimes referred to as "the first moment of truth," also referred to as "FMOT," a term generally recognized as having been coined by Procter and Gamble circa 2005. FMOT is generally recognized as the few seconds after a shopper first encounters a product on a store shelf. It is in these precious few seconds, P&G contends, that marketers have the best chance of converting a browser into a buyer by appealing to their senses, values and emotions.

The first moment of truth may vary, of course, by individual, by type of store, and/or type of product. For example, some consumers take longer than others to make a purchasing decision. Some products, such as high-priced items like automobiles, are only purchased after an extended period of time, perhaps an hour or more. As used herein, the term "first moment of truth" is intended to mean a generally recognized period of time, which may comprise a range of time, during which marketers of particular products understand that they have the best opportunity to convert a potential purchaser into a purchaser of such products by appealing to their senses, values, and/or emotions. In the context of consumer products, such as health and personal care, food, beverage, and similar items, particularly those being offered at grocery stores, supermarkets, pharmacies, convenience stores, big box stores, etc., the first moment of truth is typically recognized as being about three to seven seconds.

Recent marketing theory suggests, however, that there may actually be four "moments of truth" in the marketing context, as illustrated by the following:

Zero Moment of Truth or ZMOT: Potential purchaser recognizes the need for a product or service and may seek out additional information for it, for example by going online. This term, coined by Google, may include face-to-face meetings as well as online information acquisition. In a 2011 study, Google reported that different categories of shoppers are influenced by the Zero Moment of Truth or "ZMOT." For example, 99% of those making travel purchases were found to be influenced by ZMOT, while only 61% of consumers of packaged grocery products and only 63% of consumers of packaged goods in health, beauty, and personal care were so influenced. Such data, in the context of consumer packaged goods, indicates a need to either provide additional opportunities or incentives to influence consumers at the ZMOT, and/or to influence consumers of such products to more quickly get from the ZMOT to the FMOT.

First Moment of Truth or FMOT: The potential purchaser makes a purchasing decision when presented with the product or service, whether online, on shelf, or otherwise. Traditionally, this moment occurred at the store shelf, and may now occur on a "virtual shelf," i.e., online.

Second Moment of Truth or SMOT: The purchaser has purchased and used the product or service; ideally the experience supports any pre-purchase promises or promotional inducements. This is often the purchaser's first use of the product.

Third Moment of Truth or TMOT: The purchaser becomes a "follower" of the purchased product or service, sharing positive messaging about it with others via word of mouth, social media, etc. The purchaser may also rate the product or service and/or provide reviews therefor. This is often the point at which the brand's message reaches the purchaser in a memorable or reinforcing way, and was traditionally accomplished with television advertising.

One attempt to provide consumers information with respect to one or more of these moments of truth can be found, for example, in U.S. Patent Application No. 2013/0035787 to Canter. This published application provides a 2-D bar code at the vending machine for a consumer to link to an informational page on a website. This disclosure fails, however, to teach control of the vending machine from a smartphone or other communication device, and fails to provide any physical enticement through product sampling to a prospective purchaser of the products being supplied by the vending machine.

There exists a need to provide consumers with product sampling opportunities and product purchasing opportunities that are proximate in time and location to one another and ideally commensurate with the first moment of truth for a particular product. There exists a need to compress the four moments of truth into a shorter time span than occurs with traditional marketing methods of radio, television, and print advertising, and online shopping, and to take full advantage of the market research opportunities of product sampling by positioning the four moments of truth about a common purchasing experience and/or purchasing location. There exists a need to more readily incentivize consumers to sample product offerings and share their experiences, for example, with providers of such products and on social media, promptly following product sampling experiences.

SUMMARY

According to one aspect of the disclosure, there may be provided a method comprising initiating a push notification offering a free product sampling, receiving a response to the push notification indicative of an acceptance of the offering, and authorizing the dispensing of the free product sampling. The push notification may be provided via a mobile device application.

According to another aspect of the disclosure, there may be provided a product dispenser configured to dispense one or more products, the product dispenser may be further configured to dispense a sample size of the one or more products. The product dispenser may further comprise a user interface configured to permit a customer to request a free sample from the product dispenser, and a product size discriminator configured to discriminate between and dispense the one or more products according to whether a purchased product size or a sample product size has been selected for dispensing.

According to another aspect of the disclosure, there may be provided a system comprising a product dispenser configured to dispense a purchased product and a free sample of a product corresponding to the purchased product; and a mobile application configured to receive push notifications offering to dispense free samples of product from the dispenser.

BRIEF DESCRIPTION OF THE DRAWINGS

FIG. 5 illustrates another preferred method according to the present disclosure.

DETAILED DESCRIPTION

Figure 1:
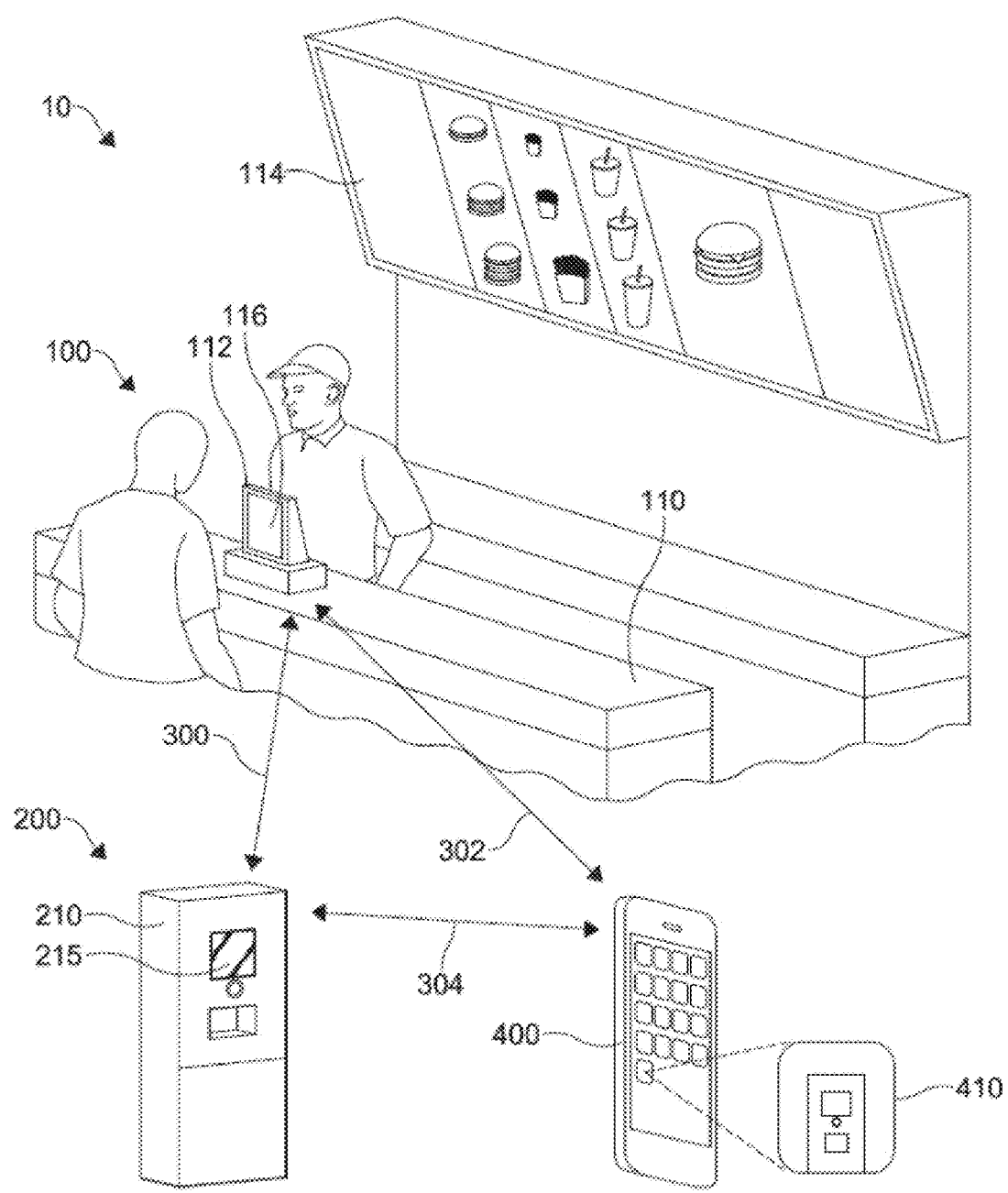
FIG. 1 illustrates a schematic representation of systems, methods, and/or apparatus of the present disclosure.

In one aspect of the disclosure illustrated in FIG. 1, a system, generally 10, comprising a point of sale, generally 100, and a dispensing area, generally 200, may be provided. The point of point of sale 100 may, for example, include one or more of a counter 110, a cash register 112, and a menu 114. Additionally or optionally, the point of sale 100 may include a display 116, such as are commonly used in connection with drive-through areas of fast food restaurants, gas stations, banks, and pharmacies, for example.

The dispensing area 200 may comprise one or more apparatus for dispensing products. For example the dispensing area 200 may comprise a dispensing machine 210 such as a Freestyle® type beverage dispenser that provides Freestyle® type beverage products of The Coca-Cola Company. Such dispensing machine 210 may comprise a keypad, touchscreen, or graphical user interface 215 configured to permit a consumer to make purchasing decisions and/or product selections from the dispensing area 200. Additionally or alternatively, the dispensing area 200 may comprise a vending machine, such as those used for vending packaged or unpackaged products, such as beverages in bottles or cans, toiletries, laundry products, pharmaceutical products, electronic products, golf balls at driving ranges, coffee beans, and the like. As another example, the dispensing machine 210 may provide products such as Apple® smart phones, tablets, and related accessories sold by Apple Computer Company, or software products such as those sold by Microsoft Corporation.

In one aspect of the disclosure, the point of point of sale 100 may be in communication with the dispensing area 200, either through a wired or wireless connection, generally 300. Indeed, the point of point of sale 100 may be in close proximity or even comprise the dispensing area 200, as in the case of a vending machine. The connection 300 may permit the point of point of sale 100 to communicate information to the dispensing area 200. Such information may, for example, include information that a purchase has been made, that the purchase, if made with a credit card, has been validated, and/or that a particular product has been selected.

One or more of the point of point of sale 100 and dispensing area 200 may communicate with a handheld or mobile device, such as a consumer's smart phone, generally 400, e.g., via a wired or wireless connection 302 between the point of sale 100 and the smart phone 400 (or other mobile device) and/or between the smart phone 400 and the dispensing area 200, via a wired or wireless connection 304. The smart phone 400 may include one or more applications 410 that may be provided by or on behalf of a merchant, such as the owner of a restaurant, store, gas station, or other location in which a dispensing area is placed, or may be provided by the entity that markets or sells the products being dispensed, such as The Coca-Cola Company in the case of a dispensing area 200 comprising a Freestyle® dispensing machine 210, and the Freestyle smart phone application, for example. Although the embodiment of the disclosure illustrated in FIG. 1 contemplates a smart phone 400 as the mobile device, it will now be appreciated that any device capable of being enabled with a user application, or capable of providing communication of information, data, and/or instructions and/or push notifications, including, for example "Google Glass" devices, Bluetooth®-enabled devices, tablets, or even implantable computer chips, may be employed according to the teachings set forth herein in keeping with the subject matter claimed herein.

In one aspect of the disclosure, a consumer may register with a provider of products or services, such as The Coca-Cola Company, using the application 410. Such registration may be used to set up an account with the provider, verify credit accounts, set limits on purchase amounts, etc. Such registration may further provide the consumer with permissions to access the dispensing area, either by using credit accounts, by using bank accounts, or by using a code or other identifier that may be provided, for example, by the provider of products or services, by the smart phone application provider, by the smart phone service provider, or at the point of purchase, for example, by the operator of the restaurant in which the point of point of sale 100 resides.

In another aspect of the disclosure, the dispensing area 200 may comprise apparatus, systems, and/or components 220 configured to permit a consumer to try a free sample of product. In the case of a Freestyle® dispensing machine 210, a free sample module 230 may be included within the dispensing machine 210. The free sample module 230 may include an area, such as a virtual button 240 on the graphical user interface 215 of the dispensing machine 210. The free sample module 230 may also include a dispenser for dispensing a free sample cup. The free sample cup may be of a size that may hold a free sample that is significantly less than a standard serving size, i.e., less than 8 fluid ounces. In one aspect, the free sample cup may hold one or two fluid ounces or less. Unless used otherwise herein, the term "sample size", in the context of liquid beverage samples, is intended to mean a single serving of less than about 8 fluid ounces (about 240 ml). In the case of other liquid products, such as laundry detergent, the term "sample size" is intended to mean sufficient liquid to perform a single operation, such as washing a typical load of clothing. As another example, in the case of contact lens solution, the term "sample size" is intended to mean several drops for one or two doses to enable application of the solution to one or two contact lenses. As another example, in the case of a cosmetic, perfume, or cologne sample, the term "sample size" is intended to mean a volume of cosmetic, perfume, or cologne roughly corresponding to the volume contained in a commercially available sample vial, packet, or other container, i.e., generally sufficient quantity for a single use.

In one aspect, it has been found that a sample size of about 2 fluid ounces (about 30 ml) of a beverage may provide sufficient sampling for a consumer to determine whether he or she wishes to dispense a full-sized single serve drink. Consumers are accustomed to being accorded free samples, for example, in supermarkets at the deli case, where such samples are provided in small disposable cups, sometimes with disposable forks or spoons. As with the supermarket example, a vendor or provider of other products, including liquid products such as beverages (both alcoholic and non-alcoholic), liquid soap, liquid detergent, lotion (hand lotion, body lotion, etc.), perfume, mouthwash, contact lens solution etc., may find it advantageous when promoting its products to provide consumers with free samples such as described herein.

The system of the present disclosure may permit a consumer to access a free sample in a number of ways. For example, the consumer may purchase a beverage of unspecified type at the point of point of sale 100. After making the purchase, the consumer may receive a code, for example on the sales receipt, that the consumer may input at the dispensing machine 210 in order to access one or more free samples. Alternatively, the consumer may have previously registered with the provider of products or services and created a password, for example, on a smart phone application, such as application 410, giving the consumer access to make purchases via his or her smart phone application. The same code or other type of access authorization may also grant the consumer authorization to select a full-size single serve beverage, or may grant the consumer authorization to access a predetermined number of servings of predetermined size. The code, or other authorization, may be input in different ways. For example, the dispensing machine 210 may comprise a virtual keypad that is part of the graphical user interface, or an actual keypad that is part of the dispensing machine 210. Alternatively, as described above, the authorization may be achieved merely by the user inputting his or her password into a smart phone application, such as application 410, which grants wireless access to the dispensing machine 210.

As another example, the consumer may have on his or her smart phone an application 410 provided by the seller of products such as, for example, The Coca-Cola Company. This application may include a user identification system that may recognize the user, based on a unique identifier provided by the seller, by the application provider, by the smart phone 400, or by a wireless service provider with whom the consumer has an account. Such identification system may, for example, permit the uses to enter his or her unique password as part of the application log on process. After log on is completed, the application 410 may, for example through wireless communication, instruct the dispensing machine 210 that the user has permission to dispense a free sample. Once permission has been granted, the consumer may be notified, i.e., via the graphical user interface on the dispensing machine 210, and/or on the smart phone 400 display, that permission has been granted to pour a free sample from the dispensing machine 210. The same identification system may also be employed to purchase products and/or dispense purchased products from the dispensing machine 210.

The systems, apparatus, and methods of the present disclosure may also be employed with more traditional beverage dispensing equipment, sometimes known as "legacy" fountain dispensing equipment, such as that used by outlets serving beverages marketed by PepsiCo. When used with legacy equipment, such equipment may be retrofitted with wireless communication components and portion control apparatus to enable dispensing of product as described herein.

In another aspect of the disclosure, the smart phone application may include, for example, push notifications that alert the consumer to new offerings, such as new flavors being offered by the product provider. Such notifications may additionally, or alternatively, make free product samples available for a limited time, at limited locations, for predetermined brands or flavors, and/or in predetermined quantities, for example.

Figure 2:
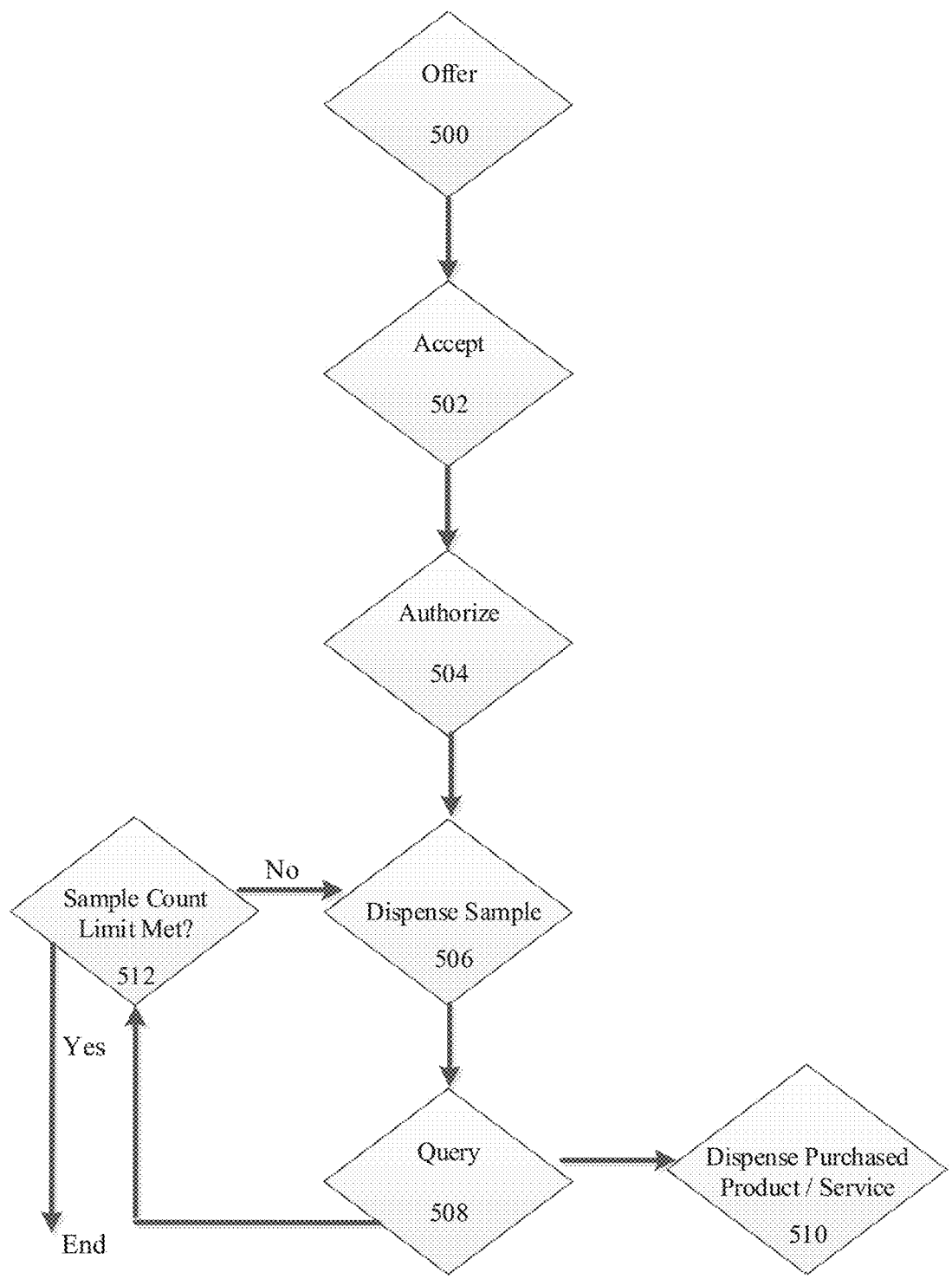
FIG. 2 illustrates operations that may be used for carrying out one or more methods of the present disclosure.

Referring now to FIG. 2, there is illustrated a method of practicing an embodiment of the present disclosure. At operation 500, a notification, such as a push notification, may be initiated, for example, by a product seller, by a service provider, by an application provider, by a mobile device such as a smart phone, or by a wireless service provider with whom a consumer has an account. This notification may be intended for one or more intended recipients, such as consumers, for example, advising them of a product or service offering and providing them an opportunity to accept a free sample of a product or a service.

At operation 502, the initiator of the notification may receive a response indicative of an acceptance of the offer, for example, from the one or more intended recipients. Such response may require the intended recipient(s) to register with the initiator of the notification, for example, by joining or downloading the smart phone application 410 onto their smart phone 400. Such registration may also require the intended recipient(s) to provide customer information such as location, demographic information, product preferences, and/or provide payment information such as a credit card number.

At operation 504, the initiator of the offer may authorize the dispensing of a free product sample or a free sample of a service. Such authorization operation may include receiving information from one or more intended recipients indicative of the one or more intended recipients having joined or downloaded a mobile application, such as mobile application 410. Such authorization may include verifying that the intended recipient accepting the offer has registered with the initiator of the offer, that the intended recipient has created an account capable of paying for a product or service corresponding to the sample product or service, or merely verifying that the intended recipient is in close proximity to the dispensing area 200.

In an alternative method, the free product or service may be authorized for dispensing at a point of sale 100. For example, if a customer purchases products such as food items at a point of sale 100, he or she may be given an offer to try a free sample of products, such as beverages, at the dispensing area 200. Such offer may include a personal identifier for the customer, such as a password or code that the customer may input, either wirelessly via a handheld device, or using a touch screen or touch pad associated with the dispensing machine 210. Alternatively, an operator at the point of sale 100 may instruct the dispensing machine 210, for example, via the wired or wireless connection 300, to permit the customer to dispense the free sample.

As another alternative, a customer may employ a mobile device, such as a smart phone 400 to place an order for a free product and/or a purchased product via the wired or wireless connection 302 to the point of sale 100. In this embodiment, the customer may or may not be responding to a push notification, rather, may initiate the communication that enables the dispensing of a free sample. In still another alternative, the customer may bypass the point of sale 100 entirely, for example, by using a mobile device, such as a smart phone 400, to connect via the wired or wireless connection 304 directly with the dispensing machine 210. As illustrated, the wired or wireless connections 300, 302, 304 may be one-way or two-way connections.

At operation 506, information indicative that the free product sampling has been dispensed may be received, for example, by the initiator of the offer. Receipt of such information may be followed up with additional push notifications. For example, after the recipient has sampled the free product sample, as evidenced by the information obtained at operation 506, at operation 508 a query or second push may be initiated, for example by sending to the one or more intended recipients a query asking if they would like to purchase the product corresponding to the sampled product. Additionally or alternatively at operation 508, the second query may ask for feedback, such as asking such recipients to rate their experience in sampling the free product, for example, indicating on a scale of 1 to 10 how much they liked the product. Depending on the feedback received, for example, if the sample was highly rated, the intended recipient may be asked if he or she would like to purchase the product corresponding to the free sample. On the other hand, if the sample was not highly rated, the intended recipient may be offered one or more additional free product samplings.

Depending on the second push or query sent at operation 508, and the response received at operation 510, the dispensing of one or more free samples and/or the dispensing of purchased product corresponding to the sampled product may be authorized. For example, if at operation 508 a response to the second push notification reveals negative feedback relative to the initial product sampling and/or that the intended recipient would like to sample one or more additional free samples, then operation 510 may authorize the dispensing of one or more additional free samples. In order to avoid an "endless loop" of negative feedback by intended recipients merely trying to "game the system" by obtaining unlimited free product samples, a counter operation may be interposed, i.e., at operation 512, to cut off the opportunity for additional free samples after a predetermined number, for example three free samples. Thus, operation 512 may count the number of requests for free samples made in response to the query operation 508 and if a predetermined number of free sample requests has not be met, may authorize the dispensing of additional free samples. Alternatively, if a predetermined number of free sample requests have been met, then operation 512 may indicate that this is the case and end the free sample query. Alternatively, the counter operation 512 may be interposed prior to the query operation 508 to indicate prior to the query being made that the predetermined number of free samples has been dispensed, and end the free sample offering.

As indicated, the query or second push operation 512 may ask the intended recipient to indicate if he or she is interested in purchasing the product or service corresponding to the free sample. If an affirmative indication is received, then the dispensing of the purchased product or service may be authorized at operation 510.

The product dispensing machine, when used for dispensing liquid product, may be of the general configuration of The Coca-Cola Company Freestyle® dispensing machine, improved according to the teachings described herein. As is well known, the Freestyle® dispensing machine stores beverage concentrates, such as Coke®, Sprite®, and other beverage concentrates and flavor concentrates, such as lemon, cherry, etc., in multiple cartridges housed within the body of the machine. These various concentrates, as is also well known, are mixed and dispensed by the Freestyle® dispensing machine in microliter doses with carbonated water to produce a finished beverage. In order to retain the desired flavor and quality profile of the concentrates, the cartridges may be chilled and/or periodically agitated by the machine. The Freestyle® vending machine is currently configured to pour a selected purchased beverage into a customer's glass, cup, or other receptacle without discriminating as to the size of the pour. Thus, a customer could currently pour a one-ounce, eight-ounce, or thirty-two-ounce serving of purchased product, but cannot currently request a sample size of a free product sample or a purchased beverage of a predetermined size.

The Freestyle® dispensing machine may be modified, however, to limit the size or quantity of the pour in response to the size of beverage being purchased and/or the size or quantity of a free sample to be dispensed. Such discrimination may be achieved using known portion control apparatus and/or software configured to limit portion sizes. In this way, a consumer might determine, due to calorie count of a caloric beverage, that he or she only wishes to purchase a smaller than standard serving size, such as a six ounce serving, for example.

The Freestyle® dispensing machine may be further configured to offer and/or display the price of a beverage based on serving size. For example, a consumer might be permitted to order any size beverage in one-ounce increments, based on a price schedule that might offer a variable price per fluid ounce based on the volume selected. Given the current obesity epidemic worldwide, but particularly in the United States, where the Freestyle® vending machine is most prominent, consumers may appreciate the option of buying only as much product as they want at a Freestyle® dispenser, particularly in the case of children, who often cannot finish a standard eight-ounce serving, and for whom obesity concerns may be particularly acute.

A sample price schedule, which may be displayed by the Freestyle® vending machine on the user interface or touchscreen 215 might appear as set forth in the following example, termed for illustrative purposes as "Freestyle® Variserve™ Pricing:

| Freestyle ® Variserve ™ Pricing | | | |
| --- | --- | --- | --- |
| Serving Size (Oz.) | Price Per Oz. ($) | Price Per Serving ($) | Calories Per Serving |
| 1 | 0.20 | 0.20 | 12.5 |
| 2 | 0.20 | 0.40 | 25 |
| 3 | 0.20 | 0.60 | 37.5 |
| 4 | 0.1625 | 0.65 | 50 |
| 5 | 0.014 | 0.70 | 62.5 |
| 6 | 0.133 | 0.80 | 75 |
| 7 | 0.129 | 0.90 | 87.5 |
| 8 | 0.125 | 1.00 | 100 |

The user interface may be configured to permit the consumer to select the serving size desired simply by pressing a touch screen section on the graphical user interface 215 corresponding to the desired serving size, i.e., as displayed on the Freestyle® Variserve™ Pricing menu illustrated above.

In another aspect of the disclosure, the seller of calorie containing products may, in order to encourage consumption of lower calorie offerings, and/or demonstrate to governmental organizations and/or the public generally their commitment to combatting the obesity epidemic, use the systems, methods, and/or apparatus disclosed herein to price their products with variable pricing based on the caloric content of the products being dispensed, for example, pricing products at a fixed price per calorie, or according to a pricing schedule that prices product being dispensed at a lower price per unit weight or volume for lower calorie products relative to products that contain a greater number of products per serving. Indeed, the variable price concept of the present disclosure may be used in combination with the portion control concept, creating a "double bonus" by offering even lower prices when both lower calorie and lower serving size selections are made. Other combinations are, of course possible.

Moms and people trying to control their weight by counting calories would benefit from being able to dispense food and beverage products based on the number of calories, such as one hundred calories' worth of beverage, nuts, seeds, yogurt, etc. Accordingly, another aspect of the disclosure may employ the teachings herein to dispense a predetermined number of calories of food or beverage product, for example, at the consumer's choosing. The dispensing apparatus may also be configured to price the product thus dispensed according to the total number of calories dispensed, rather than the weight or volume of product being dispensed.

A dispensing machine 210, such as a Freestyle® dispensing machine, may be modified to allow pricing and sales based on caloric content of the beverages offered. A price per calorie or additional surcharge per calorie may be established. In one embodiment, a discount or rebate is applied for low-calorie or zero-calorie selections. The price per calorie may be set and updated based on, individually or in combination: geographic region, type of establishment the dispensing machine 210 is located in, government regulation, third-party standards, owner/lessee preference, etc. For example, a price per calorie for a dispensing machine 210 located in a high school may be higher than the price per calorie for a dispensing machine 210 located in a fast-food restaurant. A user-customized beverage may vary in caloric content based on the particular combination of beverages and/or flavorings used to create the custom beverage. For example, a user may select on a Freestyle® dispensing machine to combine a zero-calorie cola with a high-calorie fruit flavored beverage. The combination chosen, and/or the quantity of the beverage chosen to be dispensed by the consumer, may permit the consumer to determine the amount of calories in the beverage. In one embodiment, a user may make selections for a beverage on the graphic user interface 215. A price per unit of volume, such as a fluid ounce, based on the caloric content of the selected beverage combination may then be calculated and displayed to the user on the graphic user interface 215. Additionally or alternatively to a price per unit volume, a total caloric content and price may be displayed based on a predetermined receptacle size. For example, in one embodiment, receptacles of "small", "medium", and "large" sizes may be made available to a user where the dispensing machine is located. A price based on the calories of the selected beverage may be based on the volumes of the receptacles provided and may be displayed on the graphic user interface 215 in addition to or in place of a price per fluid ounce. In one embodiment, the receptacle chosen may be detected and the price for the beverage based on the set size of the receptacle communicated to the dispensing machine 210 and the caloric content of the user-defined beverage.

In another aspect of the disclosure, a parental and/or governmental control feature may be employed. Many types of products, such as alcoholic beverages, pharmaceuticals, birth control products, adult reading materials and videos and the like, and in some venues even calorie-containing beverages, may not be legally sold to minors. Yet it may be desirable for a seller of such products, referred to generally herein as "adult products," to be able to dispense them via a product dispenser or vending machine such as those described and referenced herein. Such sale of adult products might be accomplished, for example, by incorporating an age verification operation to verify that a consumer dispensing a product is old enough to purchase the product, such as in the case of an alcoholic beverage, a calorie-containing beverage, or any "adult product" that might be dispensed, such as birth control products, adult reading materials, via a Freestyle® type dispenser, yogurt dispenser, vending machine, etc. Such age verification operation may, for example, include face recognition modules, fingerprint identification technology, or any other known means of verifying the identity and/or age of an individual.

While the above example illustrates a variable price per unit volume, i.e., fluid ounces, it should be readily appreciated that the product dispenser of the present disclosure may be configured to dispense product by weight, by volume, or, in the case of solid products such as pharmaceuticals, by number of units, such as pills. Also, the variable pricing menu may be configured to vary the pricing per unit quantity based on the type of product being dispensed. For example, in the case of perfume, some brands may be more expensive per unit quantity than other brands, but the dispenser may be configured to dispense both higher and lower cost perfumes with variable pricing based on quantity purchased.

It should be here noted that variable pricing at a dispenser of product may be used to encourage, or discourage, more or less consumption of a product. Thus, if the product being dispensed is gasoline, the dispenser may be configured to charge a higher price per gallon the greater the quantity of gasoline being purchased, for example, during a finite purchasing operation by a single customer. Similarly, if the product being dispensed is an alcoholic beverage, the price per ounce of alcoholic beverage being dispensed from the dispenser may be configured to increase as greater volumes of beverage are purchased. Indeed, the dispenser may be configured to recognize a particular consumer has having purchased, during a finite time period, a quantity of alcohol that approaches the legal limit for alcoholic consumption for an adult of typical weight. In such situations, the dispenser may be configured to halt the sale or dispensing of alcohol to such consumer until a predetermined period of time has lapsed. Such dispenser might be of particular use at a bar or restaurant, where a server may not always be able to perceive the relative intoxication of a customer. Product dispensers, such as beer taps, in such establishments, may be configured to record the quantity of alcoholic beverages, such as beer, being poured for a particular consumer. The product dispensers may be configured to track alcohol consumption using radio-frequency identification (RFID) chips embedded in each consumer's cup, mug, or glass that are coded for each individual customer. The dispenser may include, for example, an RFID reader or other type of reader that recognizes and counts each pour of beer for a particular customer and halts additional pours after a predetermined number of servings have been recorded.

The system may similarly be used to discourage overconsumption of caloric products, such as sugar-containing beverages. Thus, if the system detects that a particular consumer has, in a predetermined time period, one hour for example, consumed an excessive number of calories, it may issue a warning to the consumer, either at the point of sale, the dispensing area, and/or via the consumer's handheld device, i.e., smart phone or tablet. Similarly, the system may be configured to disallow continued dispensing of purchased or free samples of product to a consumer that has exceeded a predetermined quantity of product and/or a predetermined number of calories consumed.

In other contexts, of course, the dispenser may be configured, as illustrated above, to decrease the price per ounce as the volume being purchased increases, according to volume discount pricing protocols employed, for example, by volume discount establishments such as Costco®.

The system of the present disclosure may be configured to permit a customer to communicate with the product dispensing machine 210, such as a Freestyle® machine, for example, using a smart phone 400 in place of, or in augmentation of, the touchscreen panel display 215 of the dispensing machine 210. Thus, the customer may, employing the systems, methods, and apparatus described herein, be able to request a custom mix of a beverage to sample as a free sample. Such enablement may be achievable with relatively inexpensive and/or commonly understood software upgrades to existing Freestyle® machine software and/or the Freestyle® mobile application 410.

The same technology employed in the existing Freestyle® machine to dispense beverage products may be repurposed to dispense other liquid products, such as perfume, cologne, cosmetics, etc., either as free samples and/or as purchased products per the disclosures contained herein. One particularly attractive use of the Freestyle® dispensing technology, given its micro-dosing capabilities, may be in the area of sampling highly volatile and/or expensive liquids such as perfumes, as such samples normally must be made in small quantities. Just as consumers may mix their own blends of beverages using the Freestyle® vending machine, they may do the same, employing the teachings herein to mix, for example, their own blends of cosmetics, perfumes, colognes, etc.

According to an aspect of the present disclosure, the four moments of truth may be compressed in time and space. For example, a push notification may be provided, i.e., via a smartphone or other mobile device, to a potential consumer, providing that consumer with the type of information the consumer might otherwise seek out during the zero moment of truth. The push notification may be sent to a user's communication device irrespective of the user's or the device's location. Alternatively, the push notification may be sent to the user or the user's communication device when the user is determined to be in close proximity to a product dispenser offering products with which the push notification is concerned. Such proximity may be determined using known location determination systems, such as those enabled on smart phones such as the Apple® iPhone. The push notification may provide information including product attributes, market survey data, such as how other consumers have rated the offered product, how long the product will be offered, at what locations, for what price, etc.

The push notification may offer the prospective purchaser a free product sample at a designated location, essentially bypassing the first moment of truth, as the potential purchaser does not need, at this stage, to make a purchase decision. It is generally recognized that the most useful information concerning why a purchasing decision was made is that gathered proximate in time to the making of that decision. The push notification may thus include a requirement that the potential purchaser complete a survey, such as a pre-sample and/or post-sample survey, as a condition of being provided the free sample. The potential purchaser may then be provided a free sample and queried immediately thereafter to take a survey, for example, a multi-modal survey over a hand-held or other mobile device, or otherwise share the experience of the product or service, compressing the second and third moments of truth into a timeframe proximate the sampling experience. The prospective purchaser may be incentivized to complete a market research or data acquisition operation, i.e., by taking a survey, following the sampling experience by being offered another free sample after confirmation that the consumer has completed the data acquisition operation. In another embodiment, a potential purchaser may receive a sample and also a post-sample survey, with completion of the survey incentivized by the offer of a discount on a purchased product corresponding to the sampled product or a related product.

The seller of the product or service may capture experiential data, such as whether or not the free sample met expectations, how the potential purchaser rates the sample, etc. The potential purchaser may then be queried as to whether or not the purchase of a packaged product or service corresponding to the free sample is desired. If so, the packaged product may be dispensed or service provided. If not, the potential purchaser may be queried as to why no purchase is desired, with the information being captured for providing valuable marketing information to the seller of the product or service being offered. Such information may be captured by the seller of the product, or may, for example, be captured by known methods, including via data acquisition providers that provide online surveys, such as Toluna, which may employ social media such as Facebook, Twitter, and other apps for the purpose.

In the case of a sampled beverage, for example, being promoted by the Coca-Cola Freestyle® or PepsiCo "Touch Tower" dispensing machines, the apparatus, systems, and methods of the present disclosure may be used to capture consumer preference data that may be shared with other prospective consumers. For example, a 50-50 blend of Orange-flavored Coke and Vanilla-flavored Coke, sometimes referred to as a "Cream-side," might show a favorability rating of 92% "likes," while a less popular sample or purchased product might indicate a much lower rating. Such ratings may be displayed prior to the potential purchaser accepting the push notification offer, and/or prior to the potential purchaser being queried as to whether the purchase of a product corresponding to the sampled product is desired. The consumer may, either following sampling the product to be sampled, also be asked to rate the product for additional marketing data capture.

Figure 3:
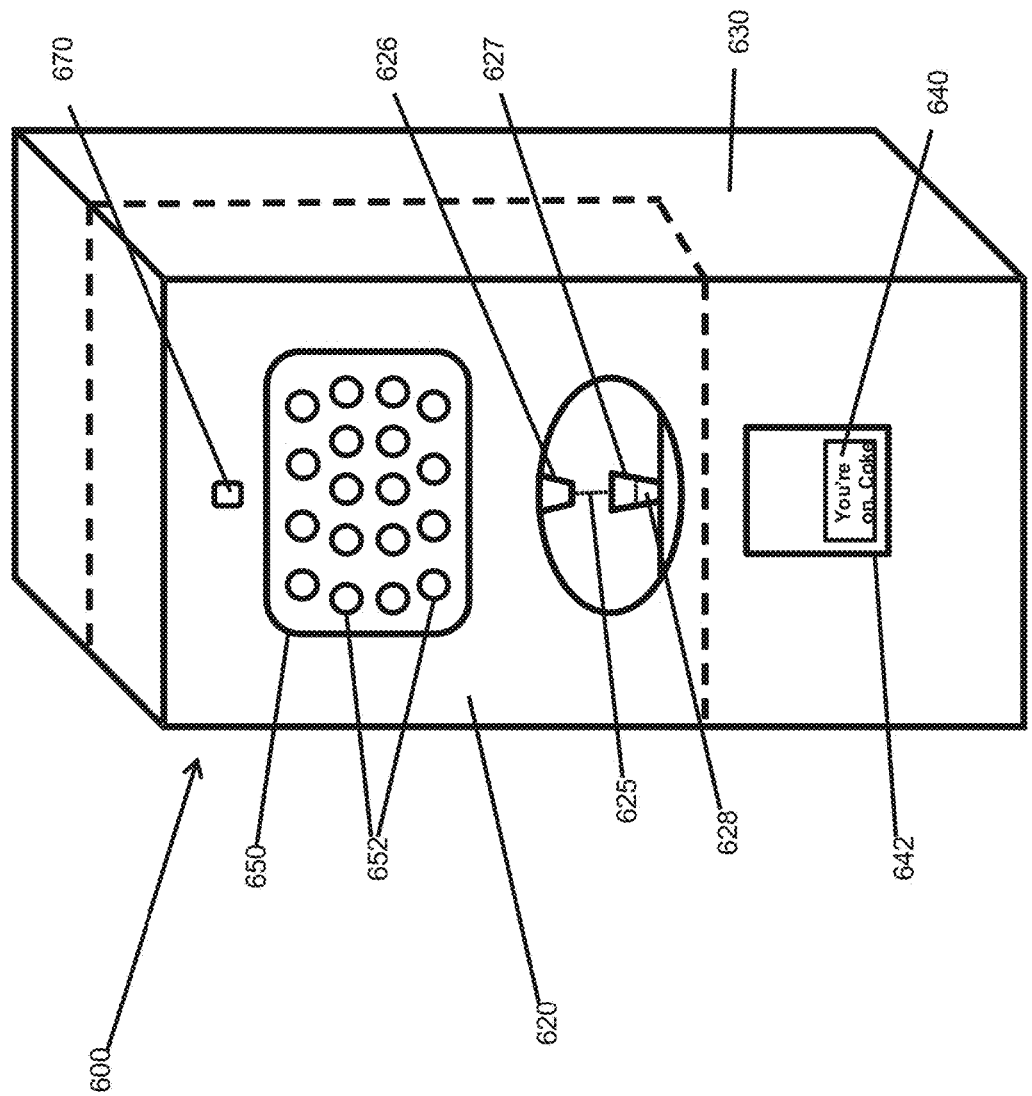
FIG. 3 illustrates a product dispenser of the present disclosure.

Another aspect of the disclosure is illustrated in FIG. 3. In this aspect, a product dispenser, generally 600, may comprise both a product sampling portion, 620 and a packaged product portion, 630, which may be configured to dispense a packaged product 640 corresponding to a product to be sampled 625 from the sampling portion 620, as will now be described. In this aspect, the product sampling portion 620 may, for example, comprise a legacy-type fountain dispenser, a Freestyle®-type dispenser as previously described, or a "Touch Tower" dispenser such as those promoted by PepsiCo, Inc., or any other device that may be configured to dispense a product sample. The product sampling portion 620 may, as another example, comprise a dispenser of solid products, subsequently described.

The product sampling portion 620 may be configured to contain a product to be sampled, 625. The product to be sampled 625 may, for example, comprise a liquid, such as a beverage, a semi-liquid, such as a yogurt product or a cosmetic lotion, cream or paste, or a solid, such as nuts, potato chips, corn chips, cookies, cookie pieces, pretzels, candy, candy pieces, pharmaceutical-type products such as pills, tablets, or lozenges, etc.

The product to be sampled 625 may be dispensed through a product sample dispenser 626, which may comprise, for example, in the case of a liquid or semi-liquid product a dispensing mechanism such as a nozzle that may further comprise a known volumetric or weight control mechanism to limit the size of the sample to a predetermined quantity, such as those commonly used, for example to fill beverage bottles at bottling plants, yogurt containers, toothpaste, pharmaceutical cream, and cosmetic tubes, etc.

In the case of a solid product to be sampled 625, the product sample dispenser 626 may comprise dispensing equipment such as used to fill potato chip bags and other snack food bags in known form, fill, and seal packaging processes, such as disclosed in U.S. Pat. Nos. 4,534,818 and 8,656,690 (assigned to Frito-Lay North America, Inc.), incorporated by reference herein. Such equipment, employed in conventional form, fill, and seal packaging machines, first weigh and measure the product in a weigher. The weighers collect and discharge a specified charge of product. Each charge represents the amount of product that will, in the case of a packaged solid food product such as potato chips, nuts, seeds, etc., occupy a single bag. Downstream from the weigher is typically a funnel or a series of funnels, which direct the product to complete the packaging operation. In this context, solid products to be sampled according to the present disclosure may be dispensed in a predetermined weight or volume employing known weighing and dispensing equipment that may be modified to dispense smaller quantities and/or fit within the confines of a product dispenser 600, which may occupy roughly the same footprint as a standard beverage or salty snack vending machine.

In one aspect of the present disclosure in which solid product samples are being dispensed, such products may be contained in storage bins within the product dispenser 600, may be portioned using a weigher, and may be conveyed, dropped, funneled, or otherwise dispensed into a sample cup or other sample receptacle, 627, or may be dispensed into the waiting hand of a consumer. When a sample receptacle 627 is employed, it may be stored, for example, in a nearby cup holder, or may be dispensed from the product sample dispenser 626 in a manner similar to that in which beverage cups are dispensed using conventional coffee vending machines.

The product sampling portion 620 may be configured to dispense liquid, semi-liquid, and solid product samples from the same product dispenser 600. Similarly, the packaged product portion 630 may be configured to dispense liquid, semi-liquid, and solid products from the same packaged product dispenser 630, corresponding to the liquid, semi-liquid, and solid products samples, respectively. The product dispenser 600 may be configured to store and serve hot, cold, and ambient temperature products, both as samples and as packaged, purchased products.

The product to be sampled, 625, may be dispensed in a sample size 628, which may be a smaller, larger, or the same quantity as the size of a corresponding purchased packaged product. In the case of a beverage, an eight or twelve-ounce can, or a 16-ounce bottle, are typical sizes of purchased packaged products that are dispensed through conventional vending machines. In the case of a solid purchased packaged product dispensed through conventional vending machines, sizes vary widely, depending upon the density of the product in question and the desired calories per serving desired within a single-serve package. In a preferred aspect of the disclosure, the sample size 628 may be smaller than the typical size of corresponding purchased packaged product, particularly when a free sample is being offered, to minimize the cost of providing a free sample. In this aspect, the sample size 628 may be predetermined to be of a size (by weight or volume) that is large enough to provide a testing consumer sufficient quantity to determine whether or not to purchase a corresponding packaged product, and ideally and preferably no larger. Such sample size 628 will obviously vary by phase of product, i.e., liquid, semi-liquid, or solid, and by product type, i.e., food, beverage, cosmetic, perfume, etc.

The product dispenser 600 of the present disclosure may comprise a packaged product portion 630 positioned in proximity to, or integral with, the product sampling portion 620. The packaged product portion 630 may comprise apparatus configured for packaged product storage, chilling or heating, and dispensing according to conventional vending machines, but may differ therefrom insofar as the packaged product portion 630 may communicate physically and/or wirelessly with the product sampling portion 620 as illustrated and described. As further illustrated, the packaged product portion 630 may be configured to dispense a packaged product, 640, such as a canned or bottled beverage or a sealed salty snack package via a packaged product dispensing bin 642, which may be conventional. The packaged product 640 may correspond to the product to be sampled 625. As used herein, the term "a packaged product corresponding to the product to be sampled" is intended to mean a product contained in a package, the packaged product being branded the same as, generally equivalent to, and in certain preferred embodiments, in all material aspects (except, perhaps, quantity) identical to, the product to be sampled in terms of product formula, quality, and physical properties.

In some embodiments, however, a packaged product may be considered to "correspond to the product to be sampled" even if not identical in formulation. For example, assume that the product to be sampled is raspberry-flavored Fanta® soft drinks, but that precise flavor is temporarily out of stock within the storage area of the packaged product portion 630. In that situation, a user of the product dispenser 600 may receive an out of stock notice and a query concerning whether a substitute product, i.e., strawberry-flavored Fanta®, is desired instead. Given the similarity of brand and product experience in this example, the strawberry-flavored Fanta® packaged soft drink is considered to "correspond to the product to be sampled," i.e., a raspberry-flavored Fanta® soft drink. As another example, diet products such as diet Coke® may utilize a slightly different sweetener system when dispensed via legacy fountain equipment relative to the sweetener system used in the canned or bottled version. But according to the present disclosure, the bottle or can formulation of diet Coke®, i.e., the packaged product, is intended to "correspond to the product to be sampled," for example, a diet Coke® formulation dispensed from legacy fountain equipment, even if having a slightly different sweetener system.

In an alternative aspect of the disclosure, the product to be sampled 625 may be packaged in a sample package, and dispensed through the packaged product portion 630 of the dispensing apparatus 600. In this aspect, the packaged product to be sampled may, for example, be packaged in a smaller size than a corresponding packaged product to be purchased. Common examples of packaged product sizes that are smaller than package sizes dispensed after purchase from a vending machine includes peanuts and pretzels served on commercial aircraft, and "travel sizes" of health, beauty, and personal consumer products, i.e., 24-gram packages of Crest® toothpaste, or small packets of products such as sun screen lotion, shaving lotion, etc., sometimes provided, i.e., by hotels to patrons who have forgotten such items. In the case of a packaged product to be sampled, i.e., a 24-gram travel size of Crest® toothpaste, it may be desirable to configure the product dispenser 600 to dispense both the packaged product to be sampled and the packaged product to be purchased through the same product dispenser 600, such as the product dispensing bin 642.

As further illustrated in FIG. 3, the product dispenser 600 may comprise a user interface 650, which may be a graphical user interface such as used on the Freestyle® or "Touch Tower" dispensing machines. Alternatively or additionally, the user interface may comprise product selection buttons such as employed on conventional vending machines. Such user interface 650 may comprise one or more buttons 652, which may be actual (mechanical) or virtual (graphical) buttons, for making a product offering and/or selection.

The user interface 650 may communicate, either via wired or wireless communication, with the product sampling portion 620 and/or the packaged product portion 630. In this aspect, a consumer may be given an opportunity to sample a product, either for free or for a fee, and may then, after having sampled the product, be given an opportunity to purchase a product corresponding to the sampled product. For example, the product dispenser user interface 650 may display an offer to try a free sample of one or more products that may be dispensed from the product dispenser 600 as herein described. The consumer may be prompted, for example, through the user interface 650, to select one or more products for sampling. Upon selection of the product to be sampled, for example, by a consumer selecting a particular button 652, the product dispenser 650 may dispense the selected sample product.

The product dispenser 650 may, after dispensing the selected sample product, query the consumer if the purchase of a packaged product corresponding to the sampled product is desired. Such purchase may, for example, be accomplished employing a conventional vending machine purchasing operation, which may occur with either a cash or cashless (credit card, i.e.) vending operation.

In a preferred aspect of the disclosure, the first moment of truth for the product being offered may be used to incentivize a purchase of the product and/or obtain market research data concerning consumers' purchase decisions. For example, if it is known that a consumer typically takes 5 seconds or less after sampling a free beverage sample before making a decision to purchase a product corresponding to that sample, the product dispenser 600 may query the user, for example, via the user interface 650, within 5 seconds of dispensing a sample, if the consumer wishes to purchase a dispensed or packaged product corresponding to the sampled product. While the consumer may, within that 5-second first moment of truth have already determined to purchase the product, the query may serve to reinforce the purchase decision. Similarly, if, during the 5-second first moment of truth, the consumer has determined not to purchase a dispensed or packaged product corresponding to the sampled product, a query nonetheless asking the consumer if a purchase is desired may encourage the consumer to change his or her mind by virtue of the query. But even if the consumer who has made a negative purchase decision is not encouraged to change his or her mind by the query, this too may be the source of useful market research information for the vendor of the sampled product. In that case, the product dispenser 600 (or smartphone app or other communication vehicle) may ask the consumer why he or she is unwilling to purchase the product, providing one or more possible answers the consumer may enter, i.e., on a touch screen associated with the user interface 650, or via a cell phone app, i.e., the Freestyle® app. Similarly, a consumer who answers the query affirmatively and purchases a product corresponding to the sampled product, may be surveyed as to why he or she purchased the product, whether he or she would do so again, etc.

Figure 4:
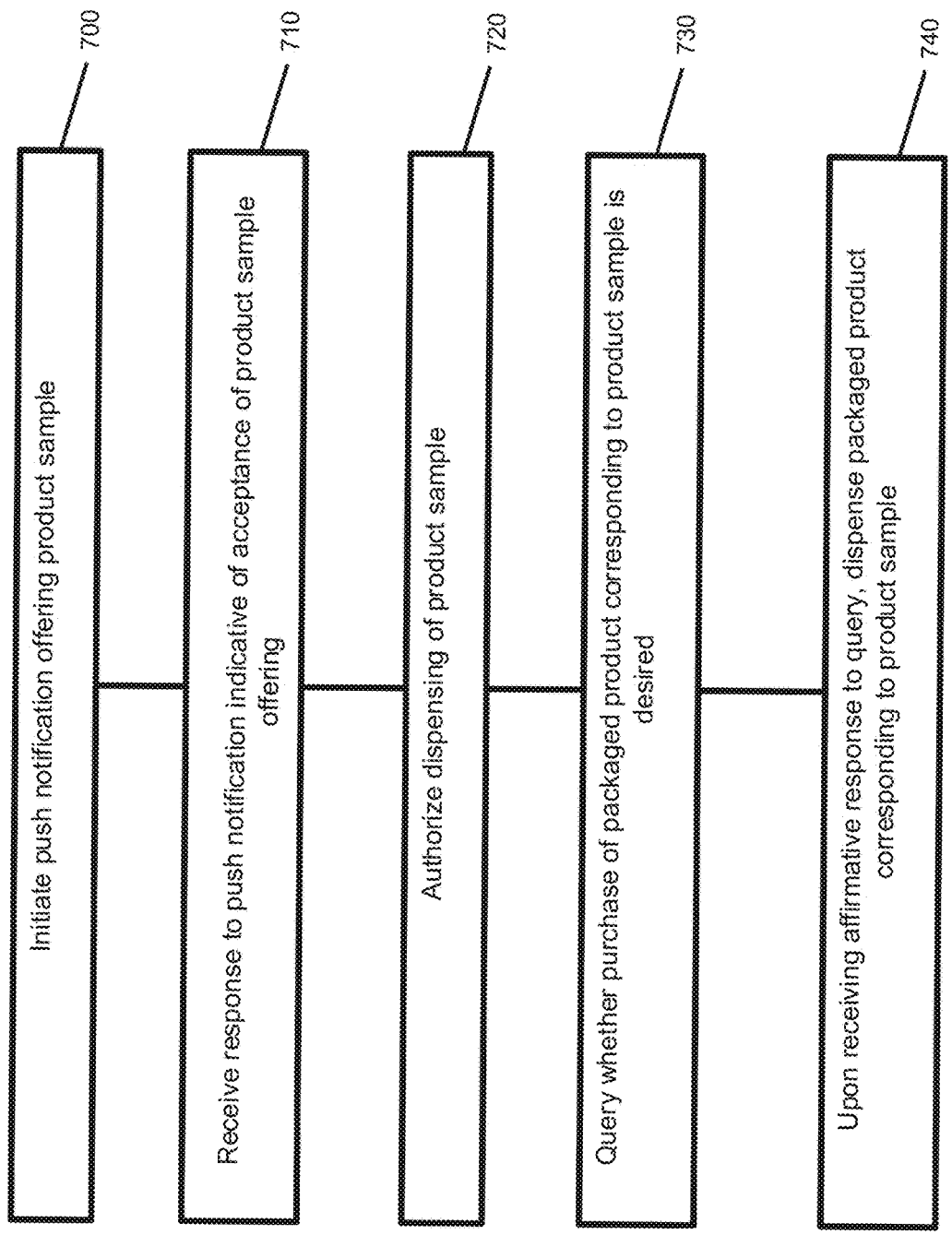
FIG. 4 illustrates a preferred method according to the present disclosure.

In an alternative embodiment of the disclosure, illustrated in FIG. 4, a push notification may be initiated at operation 700. Such a push notification may take the form previously described herein, i.e., via a wireless communication device, for example the Freestyle® smartphone app. Such notification may alert users to nearby locations at which a promotional product sampling offer is valid.

At operation 710, a response to the push notification may be received, for example indicative of an acceptance of the offering.

At operation 720, dispensing of a product sample may be authorized in response to the acceptance of operation 710.

At operation 730, a query may be provided to a source of the response to the push notification of operation 710, for example, a consumer using a smartphone app. The query may ask the consumer if there is a desire to obtain a product corresponding to the product just sampled, whether for purchase, reward redemption, as a free prize, or otherwise.

At operation 740, upon receiving affirmative response to the query of operation 730, instructions may be provided to dispense a packaged product corresponding to the product sample.

In another aspect of the disclosure, the first moment of truth (or indeed all four moments of truth) may be lengthened or shortened by providing time-sensitive incentives to the prospective purchaser. For example, assume at time=0 a sample product is dispensed for a product generally recognized as having a 7-second first moment of truth. At time=5 seconds following sample product dispensing, the consumer may be queried if a purchase of the sampled product is desired, and may be incentivized with a lesser price if the purchaser makes an affirmative decision within a period of time, say, 10 seconds after the query, following which time, the price offered may increase to the standard price of the purchased product.

As an example, this method may look like this:
1. Consumer receives a push notification offer to sample a free beverage product at a nearby Freestyle® vending machine.
2. Consumer accepts the push notification offer and receives the free sample.
3. Five seconds after the free sample is dispensed, the Freestyle® vending machine queries the consumer if he or she would like to purchase a packaged beverage corresponding to the free sample, informing the consumer that a 16-ounce packaged beverage normally costs $2.50 from vending machines, but that for the next 10 seconds, the consumer may purchase the same 16-ounce packaged beverage for $2.00. This information may be displayed on the Freestyle® user interface, with a 10-second countdown and a "purchase product" button or graphical interface positioned nearby, possibly in a flashing, blinking, or otherwise in a manner to attract attention. If the "purchase product" button is pressed, the counter may stop counting, and lock in the $2.00 purchase price for the product in issue. The dispenser may then receive payment using known methods and authorize the dispensing of a 16-ounce packaged beverage, charging the consumer $2.00 for the transaction.

The methods, systems, and apparatus of the present disclosure can be used to accomplish a wide range of possible combinations, as illustrated below. These possible combinations can be even further multiplied by varying the type of product, i.e., solid, semi-solid, or liquid. Such combinations may further be employed in conjunction with customer loyalty programs, sweepstakes, or other promotions designed to provide incentives for consumers to try products, whether for free or for a fee, and receive rewards, including free products for which payment would ordinarily be required.

Possible combinations of sample and product:
1. Free unpackaged sample, purchased packaged product
2. Free unpackaged sample, free packaged product
3. Free unpackaged sample, purchased unpackaged product
4. Free unpackaged sample, free unpackaged product
5. Free packaged sample, purchased packaged product
6. Free packaged sample, free packaged product
7. Free packaged sample, purchased unpackaged product
8. Free packaged sample, free unpackaged product
9. Purchased unpackaged sample, purchased packaged product
10. Purchased unpackaged sample, free packaged product
11. Purchased unpackaged sample, purchased unpackaged product
12. Purchased unpackaged sample, free unpackaged product
13. Purchased packaged sample, purchased packaged product
14. Purchased packaged sample, free packaged product
15. Purchased packaged sample, purchased unpackaged product
16. Purchased packaged sample, free unpackaged product Referring now to FIG. 5, there is illustrated another preferred method of practicing an aspect of the present disclosure. As illustrated at operation 810, there may be provided a push notification, for example using a smartphone app such as the Freestyle® smartphone app, or other known push notification medium, to notify one or more intended recipients of a free product sampling being offered, for example, at designated locations and/or for limited times. The offer of a free sample may be conditioned on the intended recipient(s) providing market research data or other information, either before, during, and/or after the free product sampling.

At operation 820, in response to receiving information indicative of an acceptance of the offering and the condition of acceptance, instructions may be provided authorizing dispensing of the free product sample.

At operation 830, a request for market research data from the intended recipient of the push notification may be made, in an effort to collect market research data, i.e., whether the sampled product met expectations, why or why not, etc.

At operation 840, a query may be made to the intended recipient as to whether purchase of packaged product corresponding to free product sampling is desired.

In response to a positive response to the query, instructions authorizing dispensing of packaged product corresponding to free product sampled may be provided at operation 850, for example, after payment has been received from the intended recipient. In response to a negative response to the query, at operation 860, the intended recipient may be queried as to why a negative response was provided. This information may, in turn, be stored by the product dispenser 600, may be transmitted to the product supplier, or may be otherwise stored or transmitted for further use, aggregation, etc.

In either the case of a positive response or a negative response to the query at operation 840, the product dispensing system may initiate a query at operation 870 for post-acquisition market research related to sampling and/or purchasing of product sampling and/or purchased product from the intended recipient. Such query 870 might include surveys related to consumer satisfaction with the product sampling experience, effectiveness of the product sampling in leading to a purchase decision, what the consumer liked most/least about the product sampling experience, etc.

In another aspect of the disclosure, the dispenser illustrated in FIG. 3 may be configured with known facial recognition or similar data acquisition software and/or devices, represented in FIG. 3 as element 670, which may include a camera or other imaging module positioned at a location on the product dispenser corresponding to that needed to capture within its field of view a consumer standing proximate the product dispenser 600 and to enable the dispenser 600 to either recognize a particular consumer, and/or to determine, in the case of cosmetic products, for example, a recommended color palette of cosmetic products for that particular consumer. For example, women making purchasing decisions at cosmetics counters in department stores often seek cosmetic colors that match their particular skin tone, complement their eye or hair color, etc. According to the present disclosure, the sample product dispenser may be configured to determine, based on one or more of these color parameters, i.e., skin tone, eye color, teeth color, hair color, lip color, etc., a recommended color for a particular product of interest, i.e., a lipstick, a face cream concealer, a hair color, etc., and may "counsel" the customer as to the recommended product based on such recommended color. In the case of a liquid product, such as a face cream concealer, for example, the dispenser may be configured to mix a sample thereof in a color corresponding to the recommended color, which may, in a preferred aspect, be a color that matches as nearly as possible to the consumer's natural skin color. In another aspect, a recommended cosmetic or hair color may be determined by categorizing the consumer, based on a facial data acquisition step, whether that consumer presents with "Winter," "Spring," "Summer," or "Autumn" skin, eye, and/or hair tones. Alternatively, the dispenser may be configured to offer and dispense a purchased cosmetic product or hair color corresponding to a recommended color for the particular consumer after accessing data pertaining to the consumer's unique color parameters. In an alternative aspect, such facial recognition devices may be employed with the methods, apparatus, and/or systems of the present disclosure to offer product to be sampled and/or purchased based on one or more of the consumer's facially recognized age, sex, ethnicity, size, prior purchases (in the case of a recognized prior purchaser), etc.

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, smart phone, or other machine, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

We claim:

1. A method comprising:
   a. initiating a push notification intended for a mobile application associated with a plurality of intended recipients, the push notification offering a customized food or beverage to be dispensed from a product dispenser;
   b. receiving a response to the push notification indicative of an acceptance of the offering, the acceptance generated via the mobile application;
   c. receiving, via a wireless communication between a mobile device and the product dispenser, the mobile device associated with an intended recipient and the mobile application, a request that the product dispenser dispense the customized food or beverage, the customized food or beverage comprising a mix selected by the intended recipient; and
   d. authorizing dispensing of the mix from the product dispenser.

2. The method of claim 1, wherein the customized food or beverage comprises a free sample.

3. The method of claim 1, wherein the mix comprises a beverage mix of a first user-chosen beverage and a second user-chosen beverage.

4. The method of claim 1, wherein the customized food or beverage comprises a purchased product.

5. The method of claim 1, wherein the customized food or beverage comprising a mix selected by the intended recipient comprises a mix enabled via the mobile application.

6. The method of claim 1, further including verifying that the intended recipient is located proximate the product dispenser.

7. The method of claim 1, further including displaying calorie information specific to the customized food or beverage on a display associated with the product dispenser.

8. The method of claim 1, including monitoring the intended recipient's consumption of the customized food or beverage via an RFID chip embedded in a container specific to the intended recipient.

9. The method of claim 8, wherein the monitoring includes determining a quantity or caloric content of the customized food or beverage consumed by the intended recipient, and transmitting a warning notice to the intended recipient if a predetermined quantity or caloric content of the customized food or beverage product has been consumed.

10. The method of claim 4, wherein the authorizing dispensing includes verifying that the intended recipient has created an account capable of paying for the purchased product.

11. A system comprising a product dispenser configured to dispense a user-customized food or beverage product, the product dispenser configured to communicate wirelessly with a mobile device of an intended user, and to dispense the user-customized food or beverage product responsive to a request from the intended user made via the mobile device, the request from the intended user responsive to acceptance of a push notification offer directed to the intended user, the push notification offer intended for a mobile application associated with the mobile device of the intended user, the push notification offering the user-customized food or beverage product to be dispensed from the product dispenser.

12. The system of claim 11, the acceptance having been generated via the mobile application.

13. The system of claim 11, wherein the user-customized food or beverage product comprises a user-selected mix enabled via the mobile application.

14. The system of claim 11, wherein the product dispenser comprises a wireless communication device, the product dispenser being configured to enable dispensing of the user-customized food or beverage product responsive to the request from the intended user made via the mobile device, the request received by the product dispenser via wireless communication of the wireless communication device with the mobile device of the intended user.

15. The system of claim 11, wherein the product dispenser comprises a display configured to display calorie information specific to the user-customized food or beverage product based on a quantity of the user-customized food or beverage product.

16. The system of claim 13, the system configured to enable the user-selected mix enabled via the mobile application to be preselected by the intended user.

17. The system of claim 11, wherein the product dispenser is configured with a recognition device configured to recognize the intended user.

18. A non-transitory computer readable storage medium storing instructions that when executed by one or more processors, cause the one or more processors to perform operations comprising:
 a. initiating a push notification intended for a mobile application associated with a plurality of intended recipients, the push notification offering a custom mix of a food or beverage to be dispensed from a product dispenser;
 b. receiving a response to the push notification indicative of an acceptance of the offering, the acceptance generated via the mobile application;
 c. receiving, via a wireless communication between a mobile device and the product dispenser, the mobile device associated with an intended recipient of the push notification and the mobile application, a request that the product dispenser dispense the custom mix, wherein the custom mix comprises a user-selected mix enabled via the mobile application; and
 d. authorizing dispensing of the user-selected mix from the product dispenser.

19. The non-transitory computer readable storage medium of claim 18, wherein the user-selected mix comprises a mix selected by the intended recipient via the mobile application in advance of initiating the push notification.

20. The non-transitory computer readable storage medium of claim 18, wherein the operations further comprise transmitting information intended to enable display of calorie information specific to the user-selected mix on a display associated with the product dispenser.

* * * * *